UNITED STATES PATENT OFFICE.

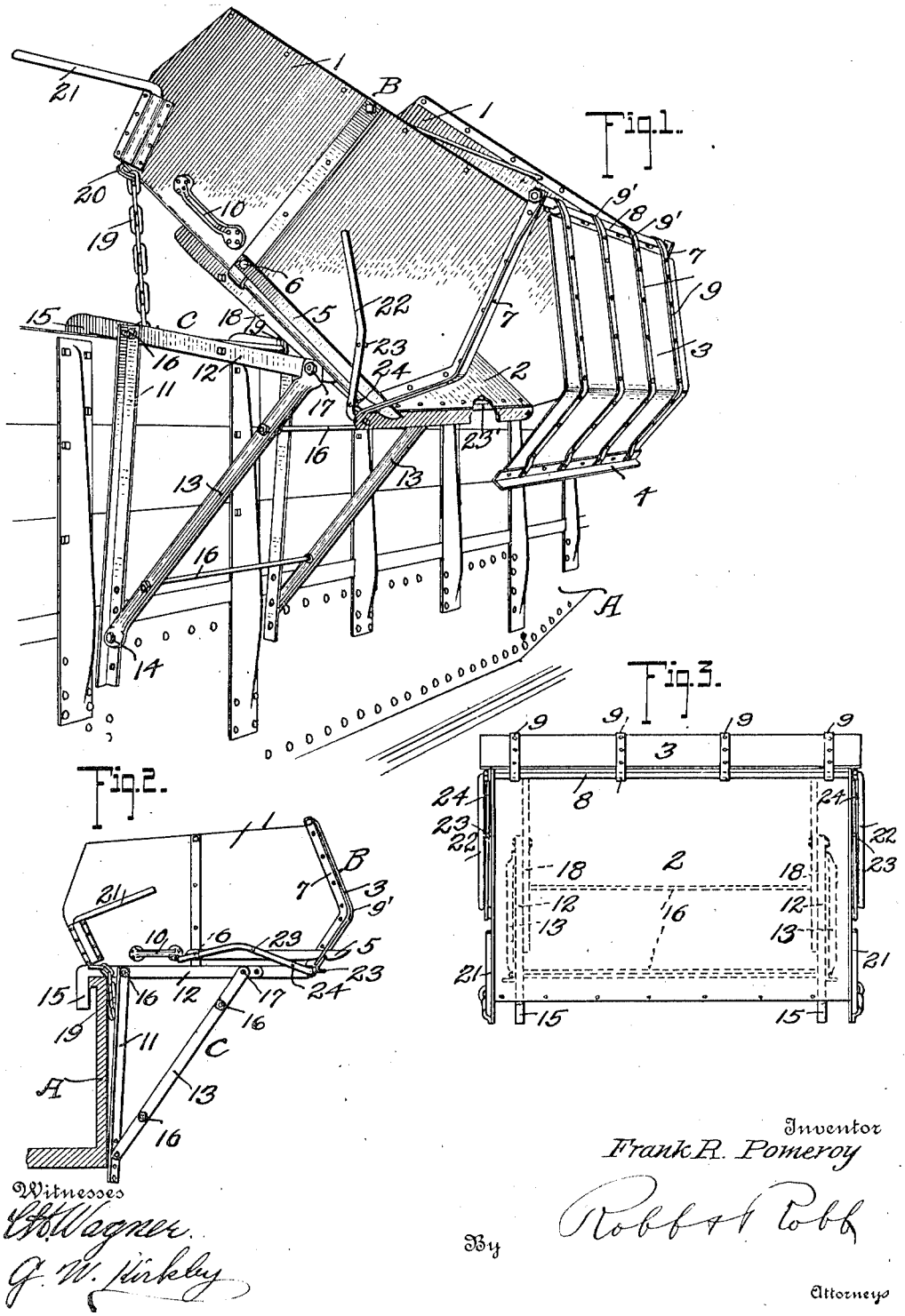

FRANK R. POMEROY, OF PHILADELPHIA, PENNSYLVANIA.

TILTING CAR-UNLOADING CHUTE.

1,066,450.

Specification of Letters Patent.

Patented July 1, 1913.

Application filed June 11, 1912. Serial No. 703,067.

*To all whom it may concern:*

Be it known that I, FRANK R. POMEROY, a citizen of the United States, residing at Philadelphia, in the county of Philadelphia and State of Pennsylvania, have invented certain new and useful Improvements in Tilting Car-Unloading Chutes, of which the following is a specification.

The present invention appertains to unloading chutes for cars of the same general type as set forth in my previous application, Serial Number 668,838, filed January 2, 1912, wherein is shown a chute adapted to be removably and adjustably supported upon the side of a car, or the like. While in the invention of my said application the chute is designed to be stationary in relation to its supporting means, in the present construction I have provided a chute which is adapted to tilt upon the support by which the receptacle is secured to the car. In the use of my previous chute there are times when the device must be placed upon a very low car, giving rise to difficulty because wagons cannot pass under the chute. I have eliminated the above disadvantage by now mounting the chute in a substantially horizontal position and adapting it for pivotal or tilting movement in the discharging operation.

For a full understanding of the present invention, reference is to be had to the following description and the accompanying drawings, in which, Figure 1 is a perspective view, showing an unloading chute embodying the essential features of the invention operably supported upon a car and illustrated in tilting discharging position. Fig. 2 is a side elevation with the chute in the position assumed thereby while being loaded. Fig. 3 is a top plan view of the chute alone.

Throughout the following detail description, and on the several figures of the drawings, similar parts are referred to by like reference characters.

The car A shown in the drawings is of a conventional type in common use and the present invention as illustrated in connection therewith consists of the chute B and its support C. The chute B comprises the sides 1, the bottom 2, the discharge door 3, and other detail parts. The discharge door 3 aforesaid is of angular formation and fits snugly against the outer open end of the body of the chute B. An angle bar 4 at the lower edge of the door 3 projects a short distance at its opposite ends so as to be readily engaged by catches 5 pivoted at 6 to the sides 1. The free ends of the catches 5 pass through slots in angle bars 7 secured to the outer extremities of the sides 1, reinforcing the latter and projecting upwardly at their upper ends sufficiently to carry the pintle rod 8. The door 3 has reinforcing plates 9 secured to its outer side and projecting at their upper extremities to form hooks 9' engaging over the rod 8 and detachably supporting the door upon the chute body. Handles 10 are applied to the opposite sides of the chute B and may be conveniently grasped in moving the device from place to place.

The support C for the chute B consists of a pair of brackets, each being composed of a vertical stay bar 11, a horizontal supporting bar 12 and a brace 13 connected at its upper portion to the bar 12 and adjustably connected by a fastening 14 to the lower end of the bar 11. The supporting bar 12 is formed with a hook 15 at its inner end. The brackets, as above described, are connected together by tie rods 16 and a pivot rod 17, the latter passing through reinforcing bars 18 secured to the under side of the bottom 2 of the chute. The point of pivotal connection 17 between the chute B and the support C is adjacent to the outer end of the chute and permits of tilting movement of the latter as limited by chains or flexible connections 19, one end of each of which is attached to the upper inner tie rod 16 and the other end of which is connected with a loop 20 on the chute B.

At its inner end and mounted on the sides 1 of the chute are arranged the handles 21 pivoted to said sides so as to fold thereagainst or assume positions projecting therefrom for convenient manipulation by an operator to raise the chute into tilted position. When the chute is tilted in the above manner, the door 3 may be readily opened by pulling upon one or the other of the handles 22 which constitute extensions or arms of a shaft 23' mounted in suitable bearings on the bottom of the chute. The handles 22 are movable freely at the outer sides of the chute and each handle is formed with two inwardly projecting pins 23 and 24, the lower pin 24 being adapted to engage the catch 5 from beneath the same to raise the latter in releasing the door 3, while the upper pin 23 is adapted to engage the upper edge of the catch and to rest thereon when the door 3 is held closed. The pins 23 normally support the handles 22 in a position convenient for operation to release the door.

A special advantage for the angular construction of the door resides in the fact that when the chute is tilted and the door has been opened, the latter will gravitate into an approximately vertical position and its lower inwardly projecting portion will form a spreader for the material in the chute as the latter discharges from the same.

From the foregoing it will be apparent that the unloading device described is of comparatively simple construction, may be very quickly mounted upon a car and removed therefrom, is adapted for a certain amount of adjustment by reason of the adjustable connections between the brace 13 and stay bars 11, and is susceptible of ready tilting and restoring movement. Furthermore, it will be understood that only one of each of the handles 21 and 22 is necessary, the provision of handles at opposite sides of the chute being merely a matter of convenience to render the operating means constituted thereby, more accessible.

Having thus described the invention, what is claimed as new is:

1. In combination, an unloading chute, a support therefor comprising a pair of brackets, each of said brackets consisting of an approximately horizontal bar having means to engage with a car, or the like, a vertical bar and a brace connected at their upper ends with said horizontal bar and connected together at their lower ends, rods connecting said brackets together, the connection between the lower ends of the vertical bar and brace of each bracket being adjustable, and other means connecting said brackets together and forming a pivotal connection between the chute and the said support.

2. In combination, an unloading chute, a support therefor comprising a pair of brackets, each of said brackets consisting of an approximately horizontal bar having means to engage with a car, or the like, a vertical bar and a brace connected at their upper ends with said horizontal bar and connected together at their lower ends, rods connecting said brackets together, the connection between the lower ends of the vertical bar and brace of each bracket being adjustable, other means connecting said brackets together and forming a pivotal connection between the chute and the said support, and a flexible connection between the support and chute to limit the pivotal movement of the latter upon the former.

3. In combination, an unloading chute, a support therefor comprising a pair of brackets, each of said brackets consisting of an approximately horizontal bar having means to engage with a car, or the like, a vertical bar and a brace connected at their upper ends with said horizontal bar and connected together at their lower ends, rods connecting said brackets together, an operative connection between the chute and said support, the connection between the chute and support permitting tilting movement of the former upon the latter, means for limiting such tilting movement, and locking means for normally holding the door of the chute closed.

In testimony whereof I affix my signature in presence of two witnesses.

FRANK R. POMEROY.

Witnesses:
 EDGAR A. HOBSON,
 AMOS S. ROWLAND.